United States Patent [19]

Zucker et al.

[11] 4,360,268

[45] Nov. 23, 1982

[54] METHOD AND APPARATUS FOR MEASURING THE INSERTION LOSS OF A SPLICE IN AN OPTICAL FIBER

[75] Inventors: Joseph Zucker, Foster City; Arthur H. Fitch, Redwood City, both of Calif.

[73] Assignee: GTE Automatic Electric Labs Inc., Northlake, Ill.

[21] Appl. No.: 205,844

[22] Filed: Nov. 10, 1980

[51] Int. Cl.³ ............................................ G01N 21/84
[52] U.S. Cl. ................................. 356/73.1; 356/434; 250/228
[58] Field of Search ...................... 356/73.1, 434, 435, 356/236; 250/228; 350/96.15, 96.16, 96.20

[56] References Cited

PUBLICATIONS

"Hot Splices of Optical Waveguide Fibers", Kohanzadeh, *Applied Optics*, Mar. 1976, vol. 15, No. 3, pp. 793–795.

*Primary Examiner*—Vincent P. McGraw
*Attorney, Agent, or Firm*—Russell A. Cannon

[57] ABSTRACT

Apparatus for field measurement of the insertion loss of a splice between one ends of first and second optical fibers comprises an integrating sphere that is split along its axis and which has a fiber input port, a pair of spaced-apart padded holes on the axis for receiving associated fibers so as to center the splice inside the sphere, and an output port receiving one end of a fiber bundle which couples diffuse light in the sphere to a radiometer. A baffle plate in the sphere prevents light rays from the splice being incident on the output port. The splice loss is determined by inserting the one end of the first fiber into the input port, with the other end illuminated by light from a source, and reading a reference level of light coupled to the radiometer. The two fibers are then spliced together and the splice located inside the sphere. With light of the reference level now incident on the splice, light scattered thereby is diffused in the sphere and coupled by bundle fibers to the radiometer which indicates the radiant power of scattered light. The splice loss is a function of the ratio of the indications of scattered and reference light.

11 Claims, 7 Drawing Figures

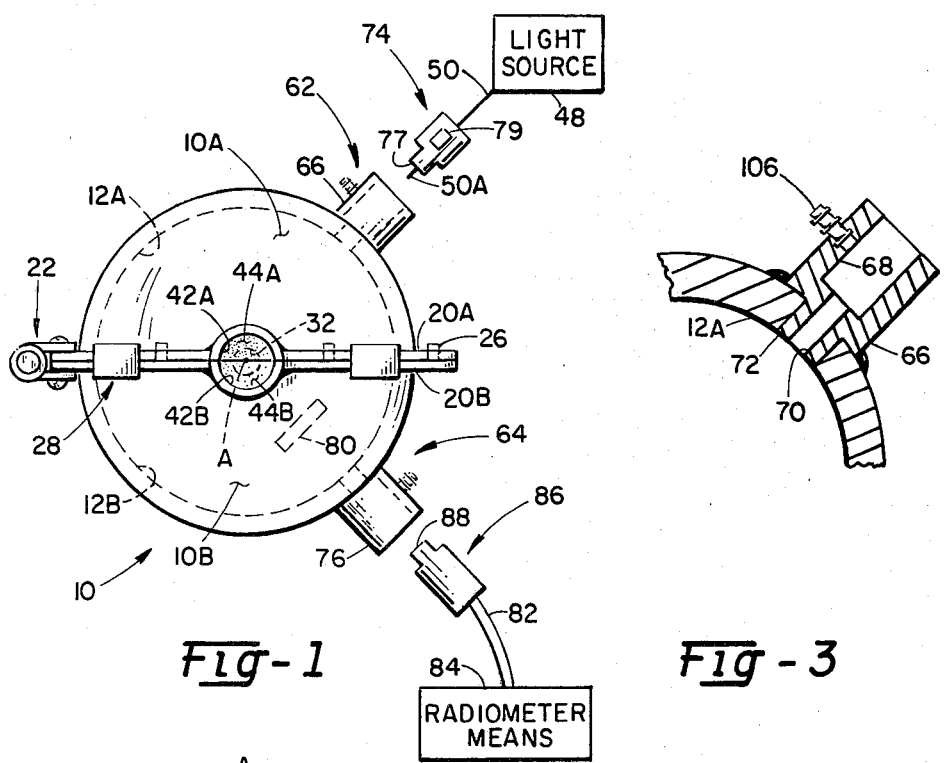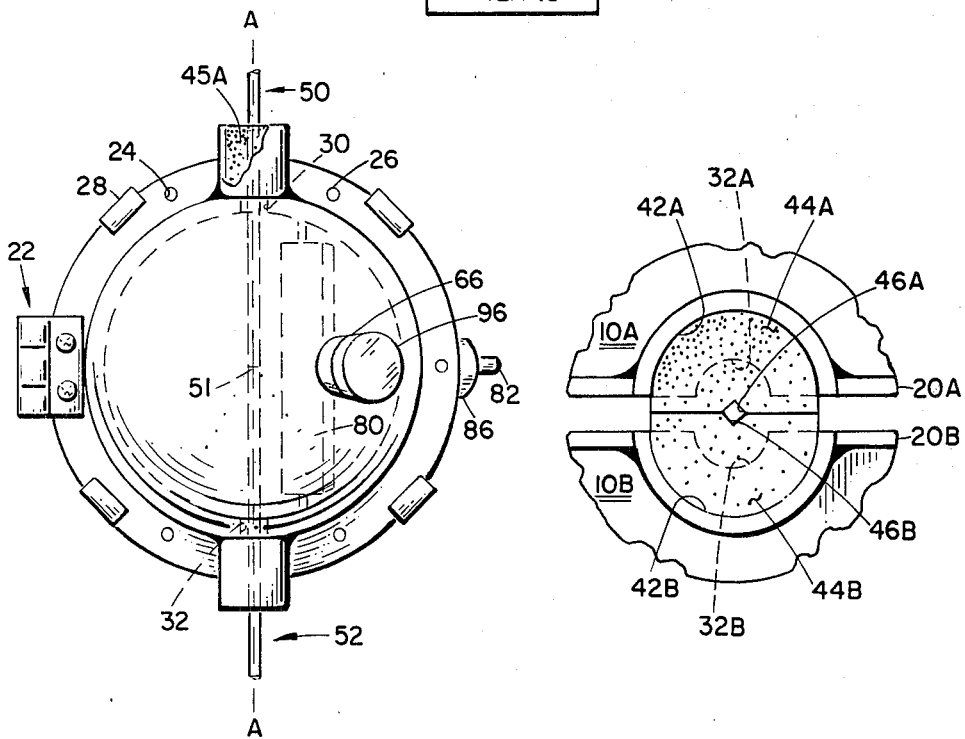
Fig-1
Fig-3
Fig-2
Fig-6

METHOD AND APPARATUS FOR MEASURING THE INSERTION LOSS OF A SPLICE IN AN OPTICAL FIBER

BACKGROUND OF INVENTION

This invention relates to determining the integrity of splices in optical fibers, and more particularly to method and apparatus for making field measurements of splice loss at the location of the splice.

In an optical communication system, it is most often necessary to splice the free end of a very short pigtail or input fiber, that is connected to a light source such as a laser diode, to the free end of a very long fiber (e.g. 10 kilometers) of the same size and type that is connected to optical receiver equipment at a remote location. The conventional method of determining splice loss is to measure the light output or reference power P1 at the free end of the input fiber prior to making a splice (this is the input power to the splice), and to measure the output power P2 at the remote end of the output fiber when this reference power on the input fiber is applied to the splice. The decibel value L1 of insertion loss of the optical system is $L1 = 10\ log\ P2/P1$. The insertion loss L2 of the splice is $L2 = (10\ log\ P2/P1) - L3$, where L3 is the decibel loss in the output fiber. This technique has the disadvantage of not being suitable for practice at the location of the splice since it requires measurement of the radiant power at the far end of the output fiber. Additionally, this technique requires knowledge of the loss of the output fiber since it must be subtracted from the overall insertion loss of the optical system in order to determine the splice loss. This technique is also inaccurate since the loss of the output fiber (which may be from 20–50 dB for a 10 kilometer length of optical fiber) will normally be much greater than the splice loss (e.g., 0.2 dB). Another method of measuring splice loss is to connect an optical time domain reflectometer to the receiver end of the output fiber. The reflectometer transmits light pulses on the output fiber and measures reflections from the splice for producing an indication or measure of splice loss. This method requires the use of relatively expensive test equipment located remote from the splice location. It has been discovered that the decibel value of the ratio of radiant light power scattered from a splice to the radiant light power incident on the splice is related to the insertion loss of the splice. Scattered light is light that passes out of the fibers in the area of the splice. An object of this invention is the provision of method and apparatus for conveniently producing a measure of splice insertion loss, and which method may be practiced solely at the location of the splice.

SUMMARY OF INVENTION

In accordance with this invention, a method of measuring the insertion loss of a splice between ends of first and second optical fibers comprises the step of producing a measurement Ps of radiant power scattered from the splice, for a given radiant power Po emitted from the one end of the first fiber and incident on the splice, and determining the insertion loss Ls of the splice from the relationship $Ls = 10\ log\ (1 - Ps/Po)$. Apparatus for use in measuring radiant power scattered from and/or the insertion loss of a splice between ends of first and second optical fibers comprises an integrating light enclosure of split construction having a pair of openings on the split that are adapted to receive and support associated fibers so as to locate the splice in the enclosure, and means for coupling only diffuse light from the enclosure when light is transmitted over the fibers and scattered by the splice.

DESCRIPTION OF DRAWINGS

This invention will be more fully understood from the following detailed description of preferred embodiments thereof, together with the drawings in which parts are not drawn to scale and in which the same reference numerals and different letters are used to designate different parts of the same elements in the various figures and embodiments. In the drawings:

FIG. 1 is an exploded view of apparatus embodying this invention and useful in practicing the disclosed methods, a side view of an integrating sphere 10 of split block construction and having an input port 62 and an output port 64 being shown here;

FIG. 2 is a top view of the integrating sphere in FIG. 1 with a plug 96 closing the input port, spliced optical fibers 50 and 52 extending through the sphere, and the splice 51 located inside the sphere;

FIG. 3 is a greatly enlarged section view of the input port 62 in FIG. 1;

FIG. 6 is an enlarged side view of portions of the two halves of the integrating sphere prior to clamping them together.

DESCRIPTION OF PREFERRED EMBODIMENTS

Figures 4, 7:
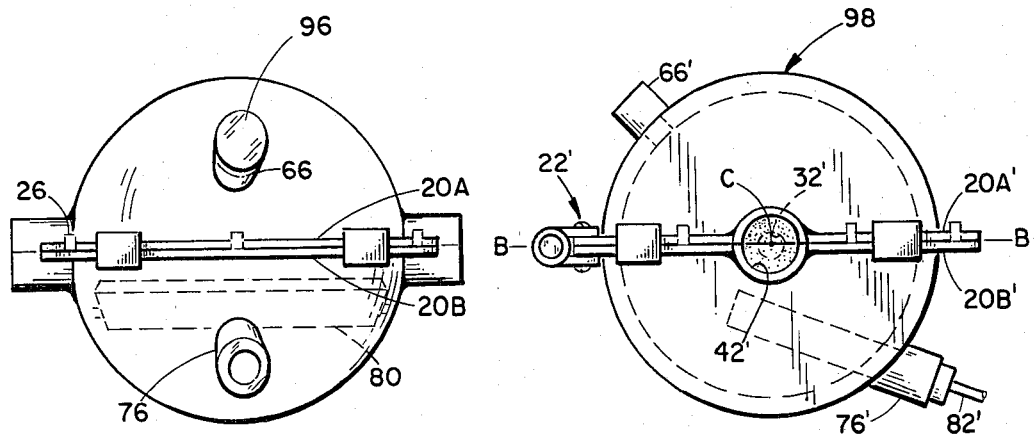
FIG. 4 is a front view of the integrating sphere in FIG. 2, with the ferrule 86 and fiber bundle 82 removed therefrom.
FIG. 7 is a side view of an alternate embodiment.

Referring now to FIGS. 1–4, the integrating enclosure there is an integrating sphere 10 which is split into halves 10A and 10B by a cutting plane through the axis A—A thereof. An integrating sphere is a device that converts input light to diffuse light, which is light that is not incident predominately from any particular direction. Integrating spheres and enclosures are manufactured by Labsphere, New London, New Hampshire. The inside surfaces of the integrating sphere and elements such as a baffle plate or plug therein are covered with a reflectance coating of a material such as magnesium oxide. Flanges 20A and 20B extend around the circumference of the open edges of the top and bottom, respectively, of the sphere, with a hinge 22 being attached to the rear of the flanges to facilitate opening and closing the sphere. Alignment holes 24 and pins 26 are located along the top and bottom flanges, respectively, for providing precision alignment of the interior surfaces 12A and 12B of the sphere parts. The two halves of the integrating sphere are secured together with clamps 28 or screws (not shown) on the flanges to form a light tight enclosure.

Figure 5:
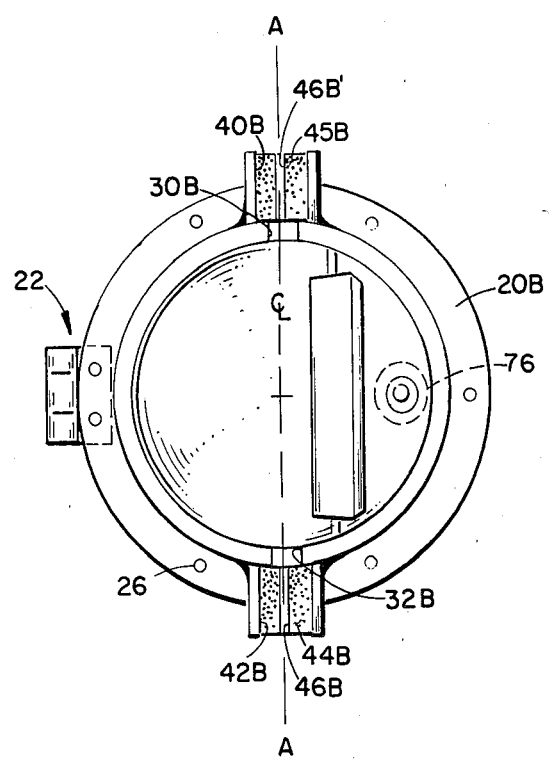
FIG. 5 is a top view of only the bottom half 10B of the integrating sphere, with the fiber bundle removed therefrom.

Each of the sphere parts has axially aligned semicircular openings, such as the openings 30B, 32A, and 32B in FIGS. 5 and 6, extending through the wall thereof. Semicylindrical channels, such as the ones 40B, 42A, and 42B in FIGS. 5 and 6, are formed in the flanges coaxial with associated ones of the openings 30 and 32. These openings and channels are dimensioned so that associated ones thereof mate when the sphere parts are closed for forming holes 30 and 32 in the wall of the integrating sphere and cylindrical sleeves 40 and 42 in the flanges (see FIG. 1). The holes 30 and 32 have a diameter that is much greater than that of optical fibers 50 and 52. The inner diameter of the sleeves 40 and 42 is much greater than the diameter of the holes 30 and 32. Each of the channels is filled with an insert 44 or 45 of resilient dielectric material such as a flexible polyester polyurethane foam that extends above the top surface of the associated flange when the sphere is open, see FIG. 6. Axially aligned shallow grooves or troughs 46B and 46B' are cut into the tops of the foam inserts 44B and 45B in the bottom channels to facilitate locating connected optical fibers 50 and 52, having a splice 51 between one ends thereof, along the line A—A when the sphere is open. The sphere is closed for firmly sandwiching the fibers between foam inserts 44A and 44B, for example in FIG. 6, with the spliced fibers substantially centered in associated ones of the holes 30 and 32 in the sphere. The sides of the foam inserts that face into these holes in the sphere may also be coated with a light reflective paint.

The top and bottom of the sphere contain an input port 62 and an output port 64, respectively, with the axes thereof in a plane that is orthogonal to the the line A—A and that extends through the center of the sphere. The axis of each port makes an angle of approximately 45° with respect to the cutting plane through line A—A and the flanges 20. The input port comprises a socket 66 having coaxial openings 68 and 70 therein, see FIG. 3. The smaller end of the socket 66 fits securely into an associated opening in the wall of the part 10A prior to attaching them together, such as by brazing. The end 72 of the input socket is flush with the inside wall of the sphere and preferably coated with reflective paint. The openings 68 and 70 are dimensioned for receiving a fiber connector 74 that is adapted for releasably holding the one end of the fiber 50 (see FIG. 1) with the end 77 flush with the inside wall of the sphere. The connector 74 is held in the openings of the socket 66 by a set screw 106 (see FIG. 3). The end 77 of the connector is also coated with reflective paint. Fiber connectors are manufactured by Nippon Electric Company.

The output port comprises a socket 76 that is similar to the socket 66, except that it has larger holes in it. A rectangularly shaped baffle plate 80 is located between the line A—A and the output port and is rigidly mounted in the bottom part of the sphere. The plane of the baffle plate is parallel to the axis A—A and oriented to prevent primary rays emanating from a splice at the center of the sphere being incident on the smaller opening in the output socket 76. A bundle 82 of optical fibers is employed to couple light from the output port 64. One end of the fiber bundle is connected to radiometer means 84. The other end of the fiber bundle is secured in a cylindrical ferrule 86 having front and rear portions thereof that are dimensioned for making a smooth sliding fit in associated openings of the socket 76. The length of the smaller end of the ferrule is preferably dimensioned for making the end 86 thereof substantially flush with the inner surface of the sphere. The end 88 of the ferrule is also coated with reflective paint.

In an existing optical communication system, the fiber 50 is most probably a pigtail on a light source 48 such as a laser diode. The input fiber 50 and output fiber 52 are, of course, of the same diameter and type. If the input fiber 50 is not associated with a light source of an existing system, the source 48 may be any suitable device that can be connected to the other end of the input fiber. The light source 48 is preferably similar, however, to what will ultimately be used in a communication link including spliced fibers 50 and 52.

In accordance with one aspect of this invention, the insertion loss of the splice 51 between the one ends of optical fibers 50 and 52 is measured and determined by first cleaving and cleaning the one end 50A of the input fiber 50. This free end 50A of the input fiber is then threaded through the connector 74 with the prepared end surface substantially flush with the end 77 of the connector. A spring loaded key 79 is compressed against the fiber 50 prior to insertion and attachment of the connector in the input socket 66. Light from the source 48 is then transmitted along the input fiber 50 and into the closed integrating sphere 10 which causes the light to be substantially perfectly diffuse light after one or two reflections from the painted sphere surfaces. Diffuse light that is incident on the ends of bundle fibers that are adjacent the inner surface of the sphere are coupled to the radiometer means 84 which provides a reading or measure Po of the reference light power emitted from the free end 50A of the input fiber.

After attaining a reading Po of reference power, the connector 79 is removed from the input socket and fiber 50. The one end of the input fiber 50 is then joined to the one end of the output fiber 52 in a splice 51 using conventional techniques such as fusion welding, epoxy splicing, or flame fusing. After opening the sphere 10, the joined fibers are set in the lower grooves 46B and 46B', with the splice 51 substantially centered in the sphere. The sphere is then closed and clamps 28 snapped over the flanges 20 to provide a light-tight enclosure. An optical plug 96 of conventional design may be located in the input socket 66 for reducing light loss from the sphere. Finally, the source 48 is again energized to pass the reference light beam down the input fiber 50, through the splice 51, and into the output fiber 52. Light scattered from the splice is diffused in the sphere, with direct rays of scattered light being blocked from the output port by the baffle plate 80. Diffuse light that is incident on the ends of bundle fibers adjacent the interior surface of the sphere is again coupled to the radiometer which now provides a second measure or reading Ps, which is a measure of light power scattered by the splice. The decibel value of splice loss Ls is calculated from the relationship $$Ls = 10 \ log \ (1 - Ps/Po). \tag{1}$$

If the ratio $Ps/Po = R$ is measured in decibels, as is the case when the radiometer means comprises a Photodyne model 22XL which includes sample and hold circuitry, then the decibel value of splice loss is determined from the relationship $$Ls = 10 \ log \ (1 - 10^{R/10}). \tag{2}$$

It has been determined empirically that, for a given fiber optic system, there is general agreement (within approximately 0.1 dB) between the values of splice loss obtained with applicant's disclosed technique and that obtained with the previously described method of measuring light transmitted through the splice.

Although this invention is disclosed in relation to preferred embodiments thereof, variations and modifications will occur to those skilled in the art. By way of example, the novel method and apparatus here are applicable to radiant energy and light in other than the visible electromagnetic spectrum. Thus the word light as used here means both visible light and invisible radiant energy in the high and low ends of the frequency spectrum including both ultraviolet and infrared radiation. Also, the integrating enclosure may be cylindrical, rectangular or any other convenient shape, although it preferably has a regular shape. Further, the enclosure does not have to be split into parts of the same size. The enclosure may be fabricated so that only a narrow segment of the top of the integrating sphere, for example, is removable for locating the spliced fibers in it such that they can be firmly-releasably held in place by resilient material when the segment is again attached to the sphere. Additionally, the holes through which the spliced fibers pass need not be axially aligned. Nor is it necessary for the slice to be located in the absolute center of the enclosure. It is important that it be possible to open the enclosure over a length thereof, however, since the other end of the output fiber 52 is unavailable in most instances, i.e., it is normally not possible to thread the output fiber through axially spaced apart openings 30 and 32 in the enclosure when the latter is closed. This is particularly true where the optical splice is made in a repeater station that is spaced many kilometers from an adjacent transmitter and receiver. Further, the input and output sockets may be at different orientations on an enclosure as long as incident light rays from the input port and the splice are blocked from the output port. In a cylindrical integrating enclosure which does not include a baffle plate, this is accomplished in the embodiment in FIG. 7 by offsetting the input and output sockets along the axis of the cylinder 98 with the fiber bundle 82' parallel to and offset from a cutting plane defined by line B—B and the longitudinal axis C—C of the enclosure. The fiber bundle 82' extends into the cylinder sufficiently to locate the pickup ends of bundle fibers beyond the center line C—C of the cylinder and the line of an incident light ray from a fiber in the input port 62'. In this structure, the exterior of the fiber bundle in the sphere is preferably coated with a reflective paint. Also, a photodetector in the radiometer means 84 may be located directly in an opening in the output socket 76 rather than coupling diffuse light to it over the fiber bundle 82. Additionally, a single fiber may be located in the output socket for coupling diffuse light to the radiometer means. And if the intensity of diffuse light is insufficient to obtain clear and definite readings from the radiometer means, the light source may be pulsed at a variable repetition frequency. In this structure, the radiometer means includes a photodetector for producing an electrical current proportional to the intensity of frequency modulated light from the enclosure and a lock-in amplifier. The amplifier is tuned to the pulse repetition frequency for narrow band filtering the detected signal and providing more clear and definite indications of the amplitudes of radiant power emitted by the input fiber and scattered by the splice. Alternatively, apparatus may be employed to mechanically chop light from the source 48 rather than electrically modulating it at a variable rate. Further, light may be connected into the input fiber from other means such as an adjacent fiber. The scope of this invention is therefore defined by the appended claims, rather than the aforementioned detailed descriptions of preferred embodiments thereof.

What is claimed is:

1. The method of measuring the insertion loss of a splice between adjacent one ends of first and second optical fibers comprising the steps of:

producing a first measurement of the radiant power of light emitted from the one end of the first fiber prior to forming the splice, said first named producing step comprising inserting the one end of the first fiber into an input port of an integrating light enclosure for converting emitted radiant light power into diffuse light in the latter, and coupling only diffuse light (associated with emitted light) from the integrating enclosure for use in producing the first measurement;

producing a second measurement of the radiant power of light scattered from the splice, for light in the one end of the first fiber that produces the first measurement being incident on the splice, said second named producing step comprising separating parts of an integrating enclosure from each other along a line therethrough; locating the first and second spliced fibers along the line so that they extend over associated wall portions of the integrating enclosure with the splice located within the latter; placing the separated parts of the integrating enclosure together over the first and second fibers for producing a relatively light-tight enclosure in which light scattered from the splice is converted to diffuse light in it; and coupling only diffuse light (associated with scattered light) from the integrating enclosure for use in producing the second measurement; and determining the insertion loss of the splice from the relationship 10 $log$ $(1-Ps/Po)$, where Ps is the second measurement (corresponding to the radiant power of light scattered from the splice) and Po is the first measurement (corresponding to the radiant power of light emitted from the one end of the first fiber).

2. The method according to claim 1 wherein said coupling steps comprise inserting one end of a third optical fiber into an opening in the wall of the enclosure, and connecting the other end of the third fiber to radiometer means.

3. The method according to claim 1 wherein said coupling steps comprise inserting one end of a bundle of optical fibers into an opening in a wall of the enclosure, and connecting the other ends of the bundle fibers to a radiometer means.

4. The method according to claim 3 wherein said coupling steps comprise inserting the one end of the fiber bundle into the enclosure and beyond the splice so that primary rays from the latter are not incident on ends of bundle fibers.

5. The method according to claim 2 or 3 wherein the integrating enclosure includes baffle means for preventing primary rays of scattered light from the splice being incident on the one ends of fibers.

6. Apparatus for measuring the insertion loss of a splice between one ends of first and second optical fibers comprising:

an integrating light enclosure, a light source for launching reference light into the other end of the first fiber, first means for selectively coupling light exiting the one end of the first fiber into said enclosure prior to forming the splice, said enclosure having first and second spaced-apart openings extending therethrough with a portion of said enclosure, between sections of the same sides defining the first and second openings, being removable from the remainder of said enclosure for enabling placement of spliced first and second fibers in associated openings with the splice inside said enclosure, said removable portion being replaced in the remainder of said enclosure for supporting the fibers in associated openings and reestablishing the integrity of the enclosure, radiometer means, and second means for coupling, from the enclosure and to the radiometer means, only diffuse light first corresponding to reference light emitted from the free end of the first fiber and second corresponding to light scattered from the splice for sequentially producing first and second measurements and said radiometer means of light emitted from the one end of the first fiber and of light scattered from the splice, respectively, when light in the one end of the first fiber corresponds to the emitted light that is incident on the splice, the splice loss being a function of the ratio of the second and first measurements.

7. Apparatus according to claim 6 wherein said enclosure is divided along a plane extending through it and a straight line extending through said first and second openings.

8. Apparatus according to claim 7 wherein said first means comprises an input port on said enclosure, said input port being adapted for receiving the one end of the first fiber so that it emits reference light into said enclosure prior to forming the splice.

9. Apparatus according to claim 8 wherein said second means comprises an output port on said enclosure and a bundle of optical fibers supported in said output port with one ends of bundle fibers being exposed to the interior of said enclosure for being illuminated by diffuse light there and coupling it to said radiometer means.

10. Apparatus according to claim 9 wherein said one ends of bundle fibers extend into said enclosure such that they are located beyond the splice so that direct light rays from the splice may not be incident on them.

11. Apparatus according to claim 7 including means in said pair of openings for loosely supporting said fibers so as to prevent generating pressure points therein which may result in loss or spurious modes on the fibers.

* * * * *